(12) United States Patent
Butterworth

(10) Patent No.: US 8,094,195 B2
(45) Date of Patent: Jan. 10, 2012

(54) DIGITAL CAMERA CALIBRATION METHOD

(75) Inventor: Mark Melvin Butterworth, Santa Clara, CA (US)

(73) Assignee: Flextronics International USA, Inc., San Jose, CA (US)

( * ) Notice: Subject to any disclaimer, the term of this patent is extended or adjusted under 35 U.S.C. 154(b) by 1291 days.

(21) Appl. No.: 11/647,540

(22) Filed: Dec. 28, 2006

(65) Prior Publication Data

US 2008/0158362 A1 Jul. 3, 2008

(51) Int. Cl.
*H04N 17/00* (2006.01)

(52) U.S. Cl. ........................................ 348/187; 348/180

(58) Field of Classification Search .................. 348/175, 348/187, 188, 180; 702/85, 116; *H04N 17/00, H04N 17/02*
See application file for complete search history.

(56) References Cited

U.S. PATENT DOCUMENTS

| | | | |
|---|---|---|---|
| 4,692,883 A | 9/1987 | Nelson et al. | |
| 4,898,467 A | 2/1990 | Milch | |
| 4,991,007 A * | 2/1991 | Corley | 348/188 |
| 5,410,153 A * | 4/1995 | Ferreira | 250/363.09 |
| 5,748,230 A * | 5/1998 | Orlando et al. | 348/187 |
| 2004/0212685 A1* | 10/2004 | Smith et al. | 348/207.99 |
| 2004/0264542 A1* | 12/2004 | Kienitz | 374/120 |
| 2006/0274188 A1* | 12/2006 | Mowry | 348/335 |

FOREIGN PATENT DOCUMENTS

JP 2003-214951 A 7/2003

OTHER PUBLICATIONS

*Bayesian color correction method for non-colorimetric digital image sensors*, Zhang, X, and Brainard, D. H., Nov. 2004, Proceedings of the 12th IS&T/SID Color Imaging Conference, Scottsdale, AZ, 308-314.
*Understanding How Image Sensors Work*, Obtained Mar. 23, 2006, www.shortcourses.com/how/sensors/sensors.htm.
PCT Application No. PCT/US2007/026360, International Search Report and Written Opinion dated Apr. 3, 2008.
PCT Application No. PCT/US2007/026360, International Preliminary Report on Patentability dated Jun. 30, 2009.
EP Application No. 07 863 264.3, European Search Report dated Nov. 30, 2010.
EP Application No. 07 863 264.3, Office Action dated Feb. 1, 2011.

* cited by examiner

*Primary Examiner* — Sherrie Hsia
(74) *Attorney, Agent, or Firm* — Henneman & Associates, PLC; Larry Henneman, Jr.

(57) ABSTRACT

A method of calibrating a digital camera includes dispersing white light through a test device to generate a color dispersion image including a plurality of different wavelengths of light; capturing a test image of the color dispersion image; obtaining intensity values corresponding to at least two of the different wavelengths of light from the test image; and comparing the intensity values to expected intensity values. The test device may include a color dispersion medium, e.g., a variable band pass filter, and/or a light transmission medium. The method may further include obtaining at least two different values corresponding to an intensity pattern image containing a plurality of intensities of undispersed light transmitted through a light transmission medium.

28 Claims, 10 Drawing Sheets

DIGITAL CAMERA CALIBRATION METHOD

BACKGROUND

1. Technical Field

This invention relates generally to camera calibration, and more particularly to a method of color and/or intensity calibrating a digital image capture device.

2. Description of the Background Art

Digital camera modules are currently being incorporated into a variety of host devices. Such host devices include cellular telephones, personal data assistants (PDAs), computers, etc. And, consumer demand for digital camera modules in host devices continues to grow.

Host device manufacturers prefer digital camera module to be small, so that they can be incorporated into the host device without increasing the overall size of the host device. Further, host device manufacturers desire camera modules that minimally affect host device design. Further, camera module and host device manufacturers want the incorporation of the camera modules into the host devices not to compromise image quality.

A conventional digital camera module generally includes a lens assembly, a housing, a printed circuit board (PCB), and an image capture device (ICD). Upon assembly, the ICD is electrically coupled to the PCB, which is affixed to the bottom of the housing. The lens assembly is adjustably mounted to the opposite end of the housing to focus incident light traveling through the lens onto an image capture surface of the ICD. The PCB includes a plurality of electrical contacts that provide a communication path for the ICD to communicate raw image data received by the ICD to the host device for processing, display and storage.

ICDs are often formed of small silicon chips containing large arrays of photosensitive diodes called photosites. When the shutter is actuated, each photosite records the intensity or brightness of the incident light by accumulating a charge; the more light, the higher the charge. The ICD sends the raw image data indicative of the various charges to the host device, where the raw image data is processed, e.g., converted to formatted image data (e.g., JPEG, TIFF, PNG, etc.) and to displayable image data (e.g., an image bitmap) for display to the user on, for example, an LCD screen.

These photosites use filters to measure light intensities corresponding to various colors and shades. Typically, each individual photosite includes one of three primary color filters, e.g., a red filter, a green filter and a blue filter. Each filter permits only light waves of its designated color to pass and thus contact the photosensitive diode. Thus, the red filter permits only red light to pass, the green filter only permits green light to pass, and blue filter only permits blue light to pass. Accumulating three primary color intensities from three adjacent photosites provides sufficient data to yield an accurately colored pixel. For example, if the red filter and the green filter accumulate a minimal charge and the blue filter accumulates a peak charge, the captured color must be blue. Thus, the image pixel may be displayed as blue.

After assembly, the camera module is typically calibrated to known intensities of light through the color filters. One prior art method includes taking a picture of a color chart (e.g., MacBeth color chart) and running the image data through color correction processes. The recorded intensities are corrected to correspond to the known color intensities. This process can be done relatively quickly, because the color correction can be effected from a single exposure.

The typical color chart is manufactured from colored dyes. Unfortunately, calibration using the typical color chart results in substandard calibration for those colors not present in dyes. The conventionally calibrated camera module has difficulty measuring other natural colors not provided by the color chart.

Some camera module manufacturers calibrate camera modules using a device called a monochromator. A monochromator sends light through a prism to output a predetermined color. Then, a picture of the predetermined color is taken. The camera module is then calibrated to the known intensity of the particular color. The process is repeated for another color, for an estimated 24 colors or more. Although the monochromator facilitates the calibration of natural colors, it has disadvantages. Such devices are relatively expensive. Also, several pictures must be taken, one for each color to be calibrated. This compromises manufacturing throughput, increases time-to-market, and increases overall manufacturing cost.

A system and method for calibrating a digital camera module are needed to increase image quality, reduce time to market, and/or provide effective quality control.

SUMMARY

In accordance with an embodiment, the present invention provides a method of calibrating a digital camera, said method comprising providing light; dispersing said light into a color dispersion image including a plurality of different wavelengths of light; capturing a test image of said color dispersion image; obtaining intensity values corresponding to at least two of said different wavelengths of light from said test image; comparing said intensity values to expected intensity values; and generating color correction data based on said comparison.

The step of providing light may include providing a beam of tungsten light. The step of dispersing said light may include dispersing said light via a test device. The test device may include a light transmission medium. The test device may include a color dispersion medium. The color dispersion medium may include a variable band pass filter. The color dispersion medium may include a translucent surface. The test device may include an opaque plate with at least one window. The opaque plate may include aluminum. The opaque plate may include a non-reflective surface. The method may further comprise using optics for focusing said color dispersion image on an image capture device. The optics may include an infrared filter. The step of obtaining intensity values may include obtaining intensity values corresponding to more than two different wavelengths of light. At least one of said intensity values may correspond to infrared wavelengths. The method may further comprise obtaining at least two different values corresponding to an intensity pattern image containing a plurality of intensities of undispersed light transmitted through a light transmission medium. The undispersed light may include light from said light source.

In accordance with another embodiment, the present invention provides a digital camera calibration device comprising an opaque screen with a window; a color dispersion device disposed in said window; and a light source disposed to emit light through said light dispersion device and said window.

The digital camera calibration device may further comprise a second window; and a light transmission medium disposed in said second transparent window. The color dispersion medium may include a variable band pass filter. The color dispersion medium may disperse white light into light at least of the visible spectrum. The opaque screen may include a substantially non-reflective surface. The non-reflective surface may include black paint. The opaque screen may include aluminum.

In accordance with yet another embodiment, the present invention provides a method of calibrating an image capture device, said method comprising providing light; dispersing said light into at least two different color components; focusing a first one of said color components onto a first group of pixels of an image capture device; focusing a second one of said color components onto a second group of pixels of said image capture device; obtaining intensity values from said first group of pixels and said second group of pixels; and using said intensity values to generate color correction data. The method may further comprise comparing said intensity values to expected intensity values.

In accordance with still another embodiment, the present invention provides a digital camera calibration device comprising an opaque screen with a window; a light transmission medium disposed in said window; and a light source disposed to emit light through said light transmission medium and said window.

In accordance with another embodiment, the present invention provides a method of calibrating a digital camera, said method comprising providing light; transmitting said light through a light transmission medium to generate an intensity pattern image; capturing a test image of said intensity pattern image; obtaining intensity values corresponding to said test image; comparing said intensity values to expected intensity values; and generating intensity correction data based on said comparison.

BRIEF DESCRIPTION OF THE DRAWINGS

The present invention is described with reference to the following drawings, wherein like reference numbers denote like elements.

DETAILED DESCRIPTION

Embodiments of the present invention overcome the problems associated with the prior art by calibrating a digital camera using a light dispersion device and a light transmission medium. In the following description, specific details are set forth to provide a thorough understanding of various embodiments of the invention. Those skilled in the art will recognize that other embodiments may be practiced without these specific details. Details of well-known practices (e.g., material selection, assembly, lens focusing operations, etc.) and well-known components have been omitted, so as not to unnecessarily obscure the description of the present invention.

Figure 1:
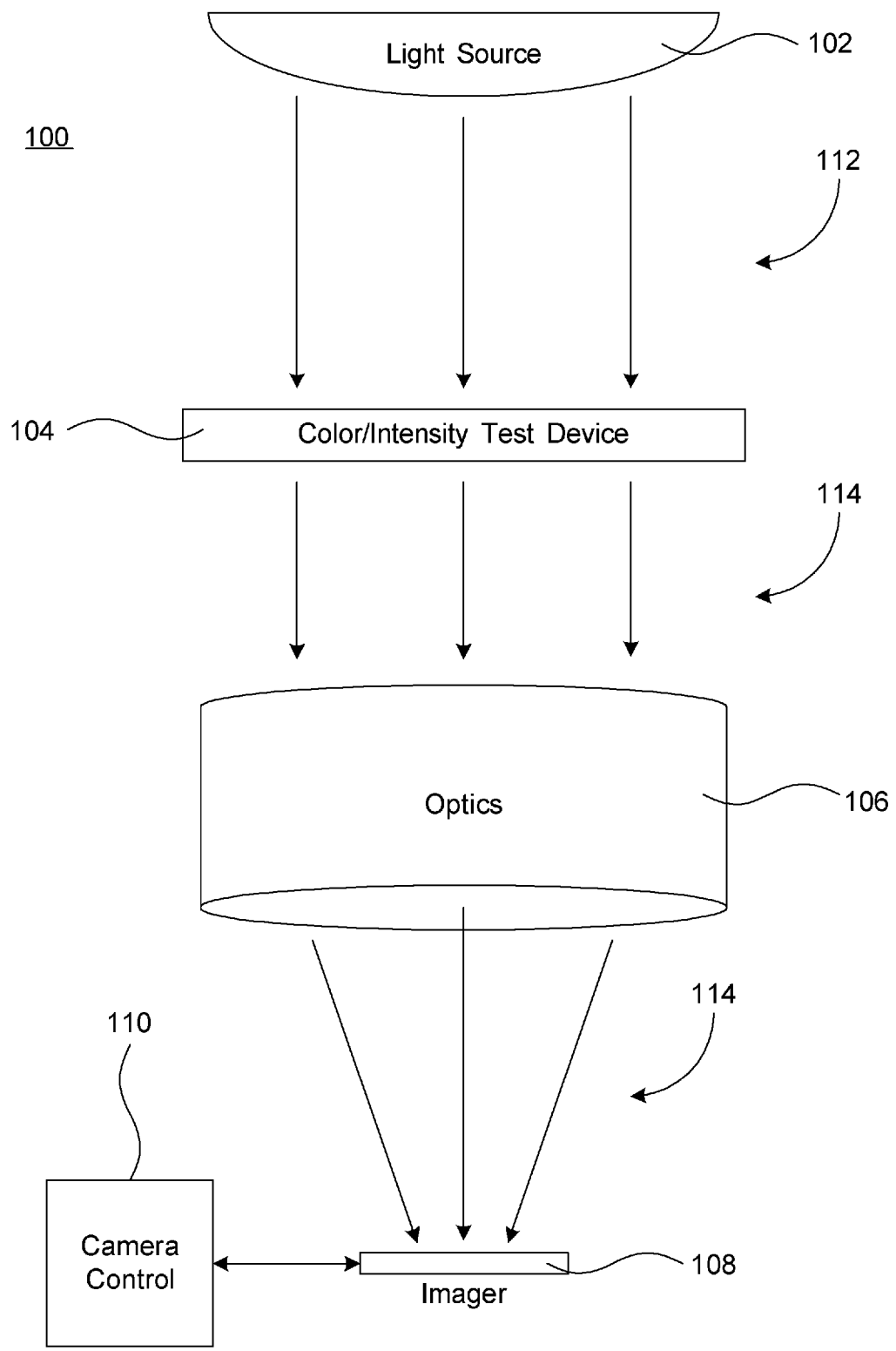
FIG. 1 is a block diagram illustrating a system for calibrating a digital camera, in accordance with an embodiment of the present invention.

FIG. 1 illustrates a system 100 for calibrating a digital camera by capturing a color dispersion image from a color dispersion medium and an intensity pattern image from a light transmission medium, in accordance with an embodiment of the present invention. As shown, the system 100 includes a light source 102, a color/intensity test device 104, optics 106, an imager 108, and a camera control component 110 coupled to the imager 108. Light source 102 (e.g., tungsten light) provides white light 112 that is exposed to the rear surface of test device 104. Test device 104 disperses white light 112 into color dispersion image 114 of a predetermined range (e.g., 300 to 700 nanometers) in order to provide at least a portion of a visible spectrum. Alternatively and/or additionally, test device 104 transmits at least one intensity pattern image 114 containing a pattern of light intensities, possibly of the same color or all colors, e.g., gray-scale. Camera optics 106 focuses color dispersion and intensity pattern images 114 onto image capture device 108, allowing image capture device 108 to capture a test image of the color dispersion and intensity pattern images. Image capture device 108 may be controlled by camera control component 110, as is well known to those skilled in the art.

In some embodiments, all color and intensity information needed for digital camera calibration may be collected in a single exposure. Also, the spectrum of color dispersion image could be configured to include infrared and/or other wavelengths for other quality control processes. For example, if the image capture device captures infrared light in excess of a predetermined threshold, the infrared filter may be deemed defective. Such quality control may be implemented using the data captured in the same exposure as used by the color/intensity calibration. Data manipulation processes (e.g., matrix functions, lookup tables, etc.) that follow the collection of color/intensity information are known to those skilled in the art. For example, in certain embodiments, the color intensity values of the light source will be determined and subtracted from the color dispersion image and/or intensity pattern image to, in effect, normalize the white light.

Figure 2:
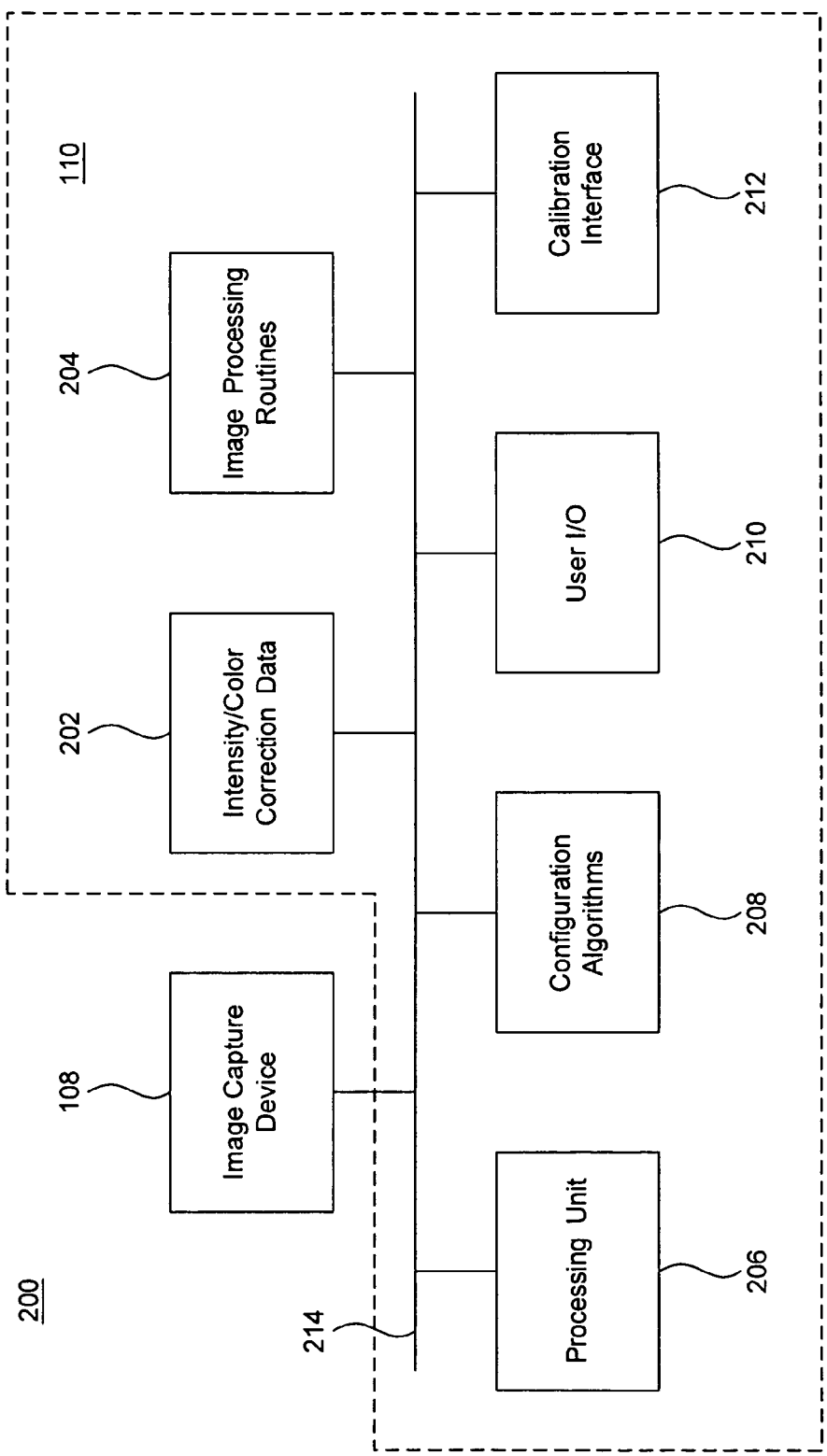
FIG. 2 is a block diagram illustrating details of the camera control component, in accordance with an embodiment of the present invention.

FIG. 2 is a block diagram illustrating details of camera control component 110, in accordance with an embodiment of the present invention. Camera control component 110 includes color/intensity correction data 202, image processing routines 204, processing unit 206, configuration algorithms 208, a user input/output (I/O) 210, and a calibration interface 212, all in communication via a communication channel 214. Color/intensity correction data 202 includes color/intensity calibration information that facilitates the correction of color and intensity values generated by image capture device 108 (e.g., color correction matrices). Image processing routines 204 include routines that facilitate the processing of images captured by image capture device 108. Processing unit 206 includes a CPU for processing the data and routines. Configuration algorithms 208 include routines for generating the color/intensity correction data based on configuration settings. User I/O 210 facilitates communication between a user and camera control component 110. Examples of I/O devices include keypads, displays (e.g., LCD display), speakers, etc. Calibration interface 212 includes routines to enable a manufacturer to load color/intensity correction data into camera control component 110.

Figure 3:
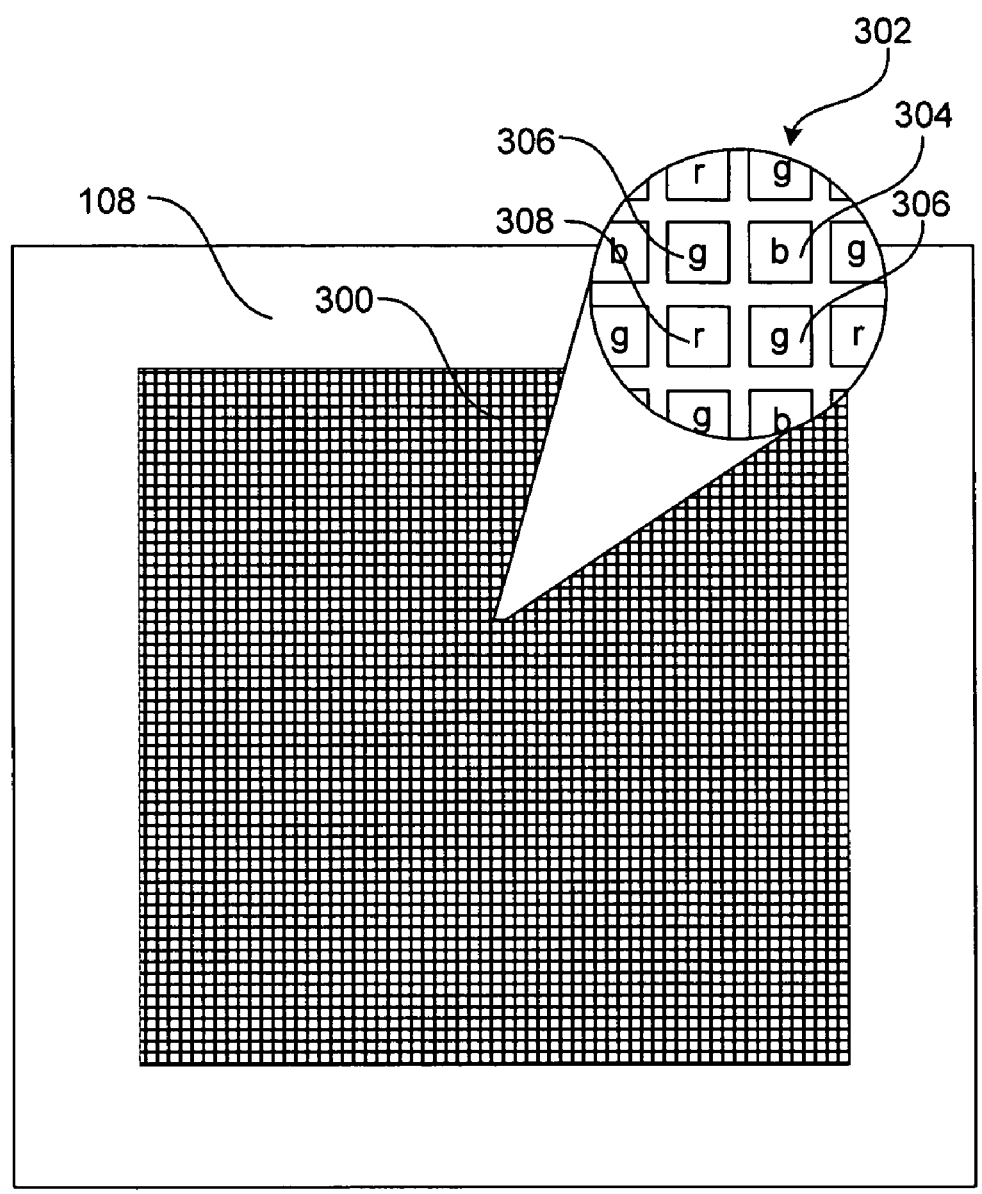
FIG. 3 illustrates an image capture device, in accordance with an embodiment of the present invention.

FIG. 3 illustrates image surface 300 of imager 108, in accordance with an embodiment of the present invention. Image surface 300 includes an array of photosites 302. Each photosites 302 includes one of either a blue filter photosite 304, a green filter photosite 306, or red filter photosite 308. Each photosite 304, 306, 308 permits only light of the designated color to pass. Upon exposure to incident light, each individual photosite 304, 306, 308 records a light intensity value for its corresponding color. The values are then processed and displayed. Although it may vary from one imager 108 to another, there are typically twice as many green photosites as there are red or blue photosites, because the human eye is twice as sensitive to green light. Conventionally, filters are arranged in a pattern called the Bayer pattern, namely, one row of red, green, red, green (etc.), and the next row of blue, green, blue, green (etc). However, other particular colors and geometric layouts of color filter photosites 304, 306, 308 may be used. As one example, imager 108 could be CMYK type.

Figure 4:
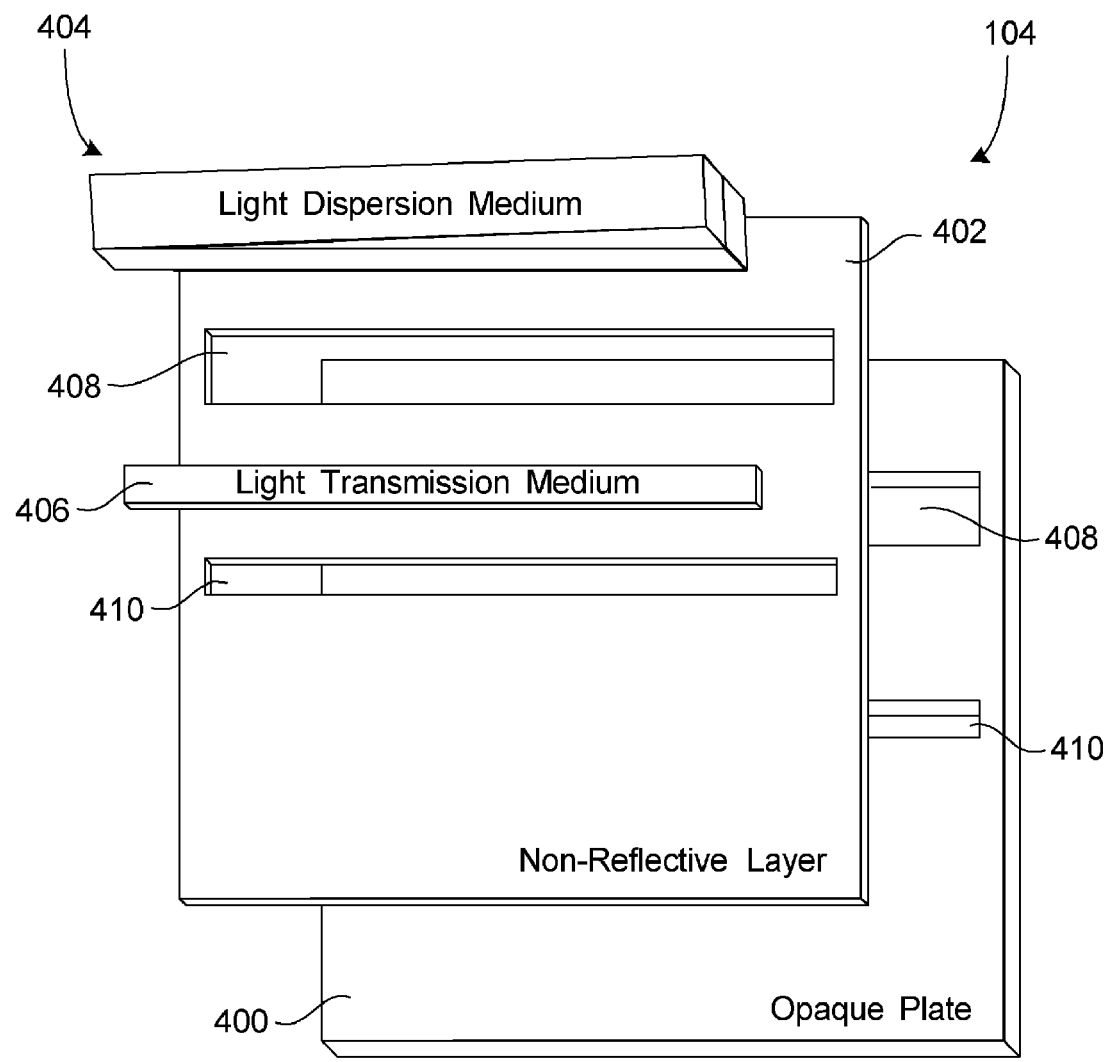
FIG. 4 illustrates a test device, in accordance with an embodiment of the present invention.

FIG. 4 is a block diagram illustrating details of a test device 104, in accordance with an embodiment of the present invention. Test device 104 includes an opaque plate 400, a non-reflective layer 402, a light dispersion medium 404, and a light transmission medium 406. Opaque plate 400 comprises, for example, aluminum. The front surface of opaque plate 400 is substantially covered with non-reflective layer 402 of, for example, black paint. When capturing an image from light dispersion medium 404 and an image from light transmission medium 406 for color and intensity calibration, non-reflective layer 402 absorbs any random light that could interfere with the desired image.

Opaque plate 400 and non-reflective layer 402 include windows 408 and windows 410, which seat light dispersion medium 404 and light transmission medium 406, respectively. Light dispersion medium 404 may be a variable band pass filter or the like, which receives incident light through the rear surface and disperses light into a color dispersion image. In one embodiment, the height of the color dispersion image is several pixels. Light transmission medium 406 may be a photographic film type grayscale medium, which permits varying light intensities to pass to generate an intensity pattern image. In one embodiment, the intensity pattern image is several pixels. Light dispersion medium 404 and light transmission medium 406 will be further discussed below with reference to FIG. 5.

Figure 5:
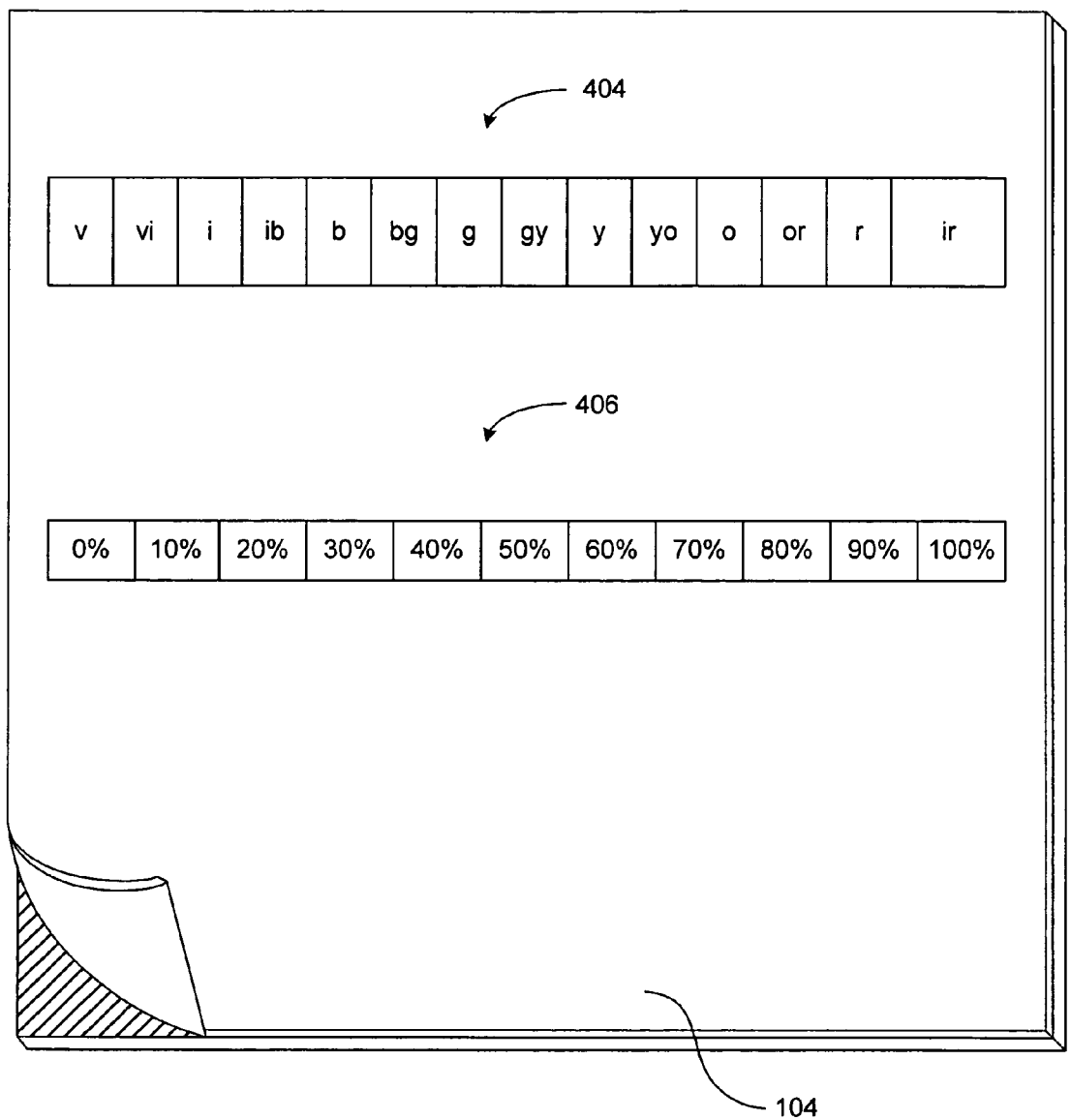
FIG. 5 illustrates color dispersion and intensity pattern images from the test device, in accordance with an embodiment of the present invention.

FIG. 5 illustrates color dispersion and intensity pattern images generated by test device 104 when backlit, in accordance with an embodiment of the present invention. Light dispersion medium 404 receives white light through it's rear surface, and bends the various wavelengths of incident light at different angles, thereby providing color dispersion image from the opposite surface (surface of the image to be captured). As shown, light dispersion medium 404 emits colors ranging from violet (V) to infrared (IR). Note that the color distribution distances (i.e., v, vi, i, ib, b . . . etc.) of light dispersed through light dispersion medium 404 are not to scale. As is well known, color change along a spectrum is continuous and not distinctly separated as shown here. For example, pure yellow does not abut pure red. There are many colors in between (e.g., orange). Light transmission medium 406 permits varying light intensities to pass, possibly of the same color, e.g., gray, to generate an intensity pattern image. As shown, such light intensities may vary from a 0% response (opaque) to a 100% response (transparent). The change in response along light transmission medium 406 may be configured to linearly or step-wise increase or decrease, depending on how it is placed onto opaque plate 400.

Figure 6:
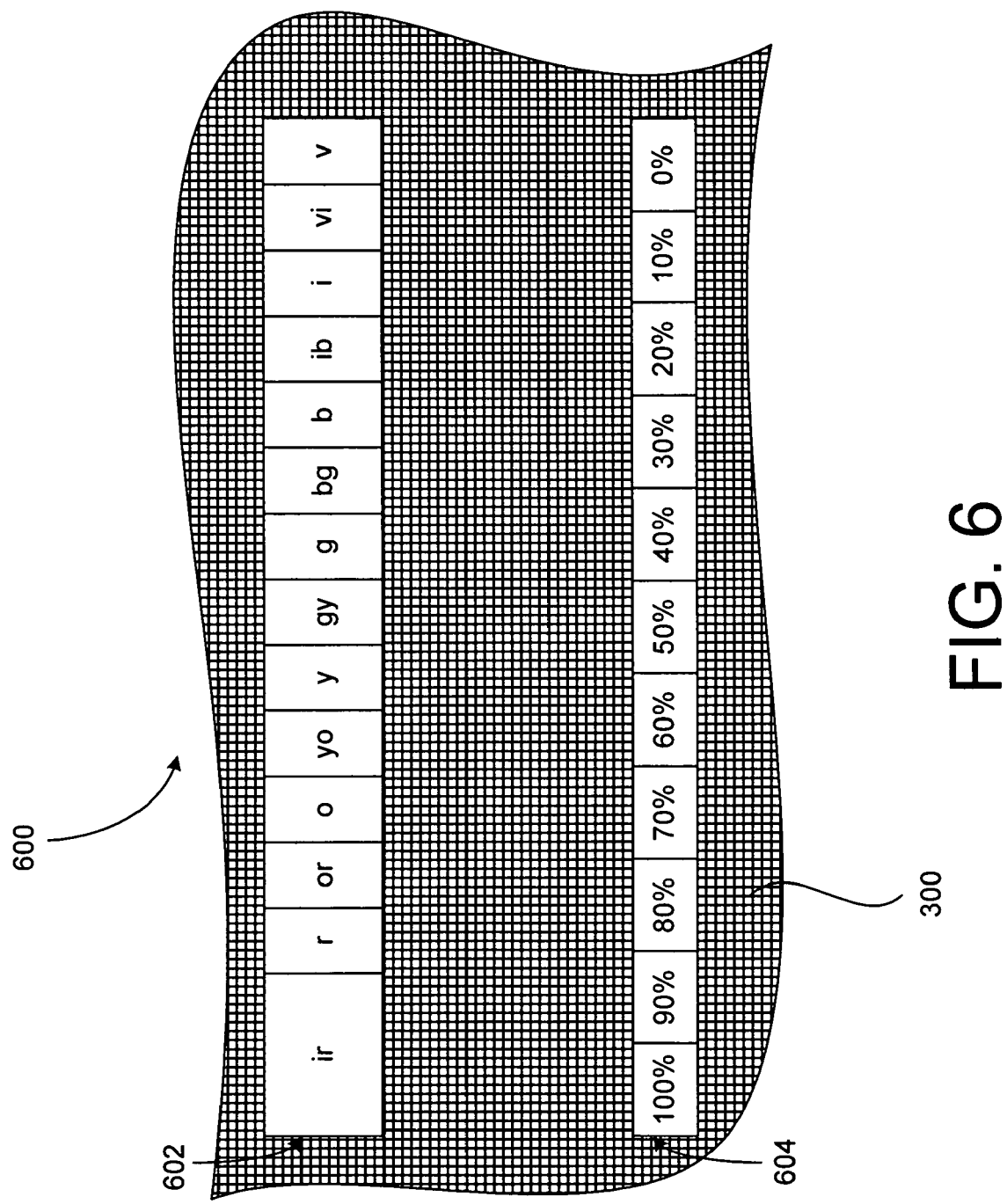
FIG. 6 illustrates color dispersion and intensity pattern images as captured by an image capture device, in accordance with an embodiment of the present invention.

FIG. 6 shows a test color dispersion image 602 and a test intensity pattern image 604 captured by portion 600 of image surface 300, in accordance with an embodiment of the present invention. Image surface 300 captures the test color/intensity calibration values. That is, the color dispersion image 602 may include intensity values for each color along the rows of the portion 600 of the image surface 300. The test intensity pattern image 604 may include intensity values for each pixel (a predetermined set of adjacent photosites) to generate general intensity values, e.g., gray-scale intensity values. Knowing the actual color dispersion image emitted from light dispersion medium 404 and the actual intensity pattern image emitted from light transmission medium 406, the test color dispersion image 602 and test intensity pattern image 604 can be evaluated and the digital camera can be calibrated.

Figure 7:
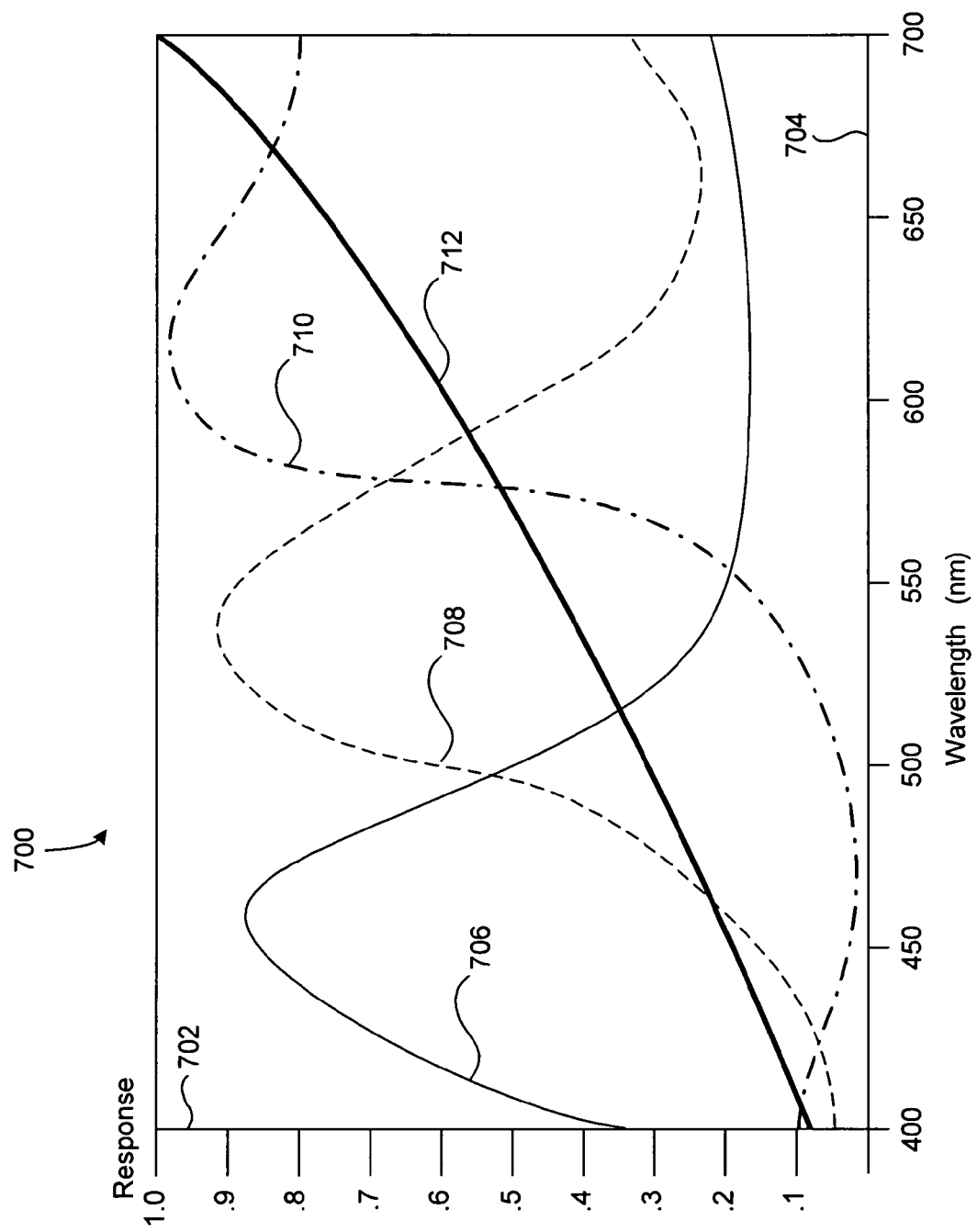
FIG. 7 is a graph illustrating response values captured by an image capture device to a color dispersion and intensity images from the test device, in accordance with an embodiment of the present invention.

FIG. 7 is a graph 700 illustrating response values captured by an image capture device 108 to a color dispersion and intensity images from the test device 104, in accordance with an embodiment of the present invention. Graph 700 includes a vertical axis 702 that represents intensity response percentage of light from light source 102. As shown, the intensity response of axis 702 ranges from 0% response to 100%. Further, graph 700 includes a horizontal axis 704 that represents position along light dispersion medium 404 and along light transmission medium 406.

Graph 700 includes: a blue response curve 706, a green response curve 708, a red response curve 710, and an intensity response curve 712. Curves 706, 708, and 710 represent color intensity response data captured for blue filter photosites 304, green filter photosites 306, and red filter photosites 308, respectively. Response curve 712 represents data corresponding to varying light output intensities along light transmission medium 306. The full intensity of a given light source will ideally equal 1.0 when viewed through the 100% transmission end of light transmission medium 406. Accordingly, the response will equal 0.5 when measuring response through the 50% transmission portion of light transmission medium 406. Once such data is captured, color correction matrices can be calculated using methods known those skilled in the art. One such method is disclosed in Xuemei Zhang, David H. Brainard: Bayesian Color Correction Method for Non-Colorimetric Digital Image Sensors, Color Imaging Conference 2004: 308-314.

Figure 8:
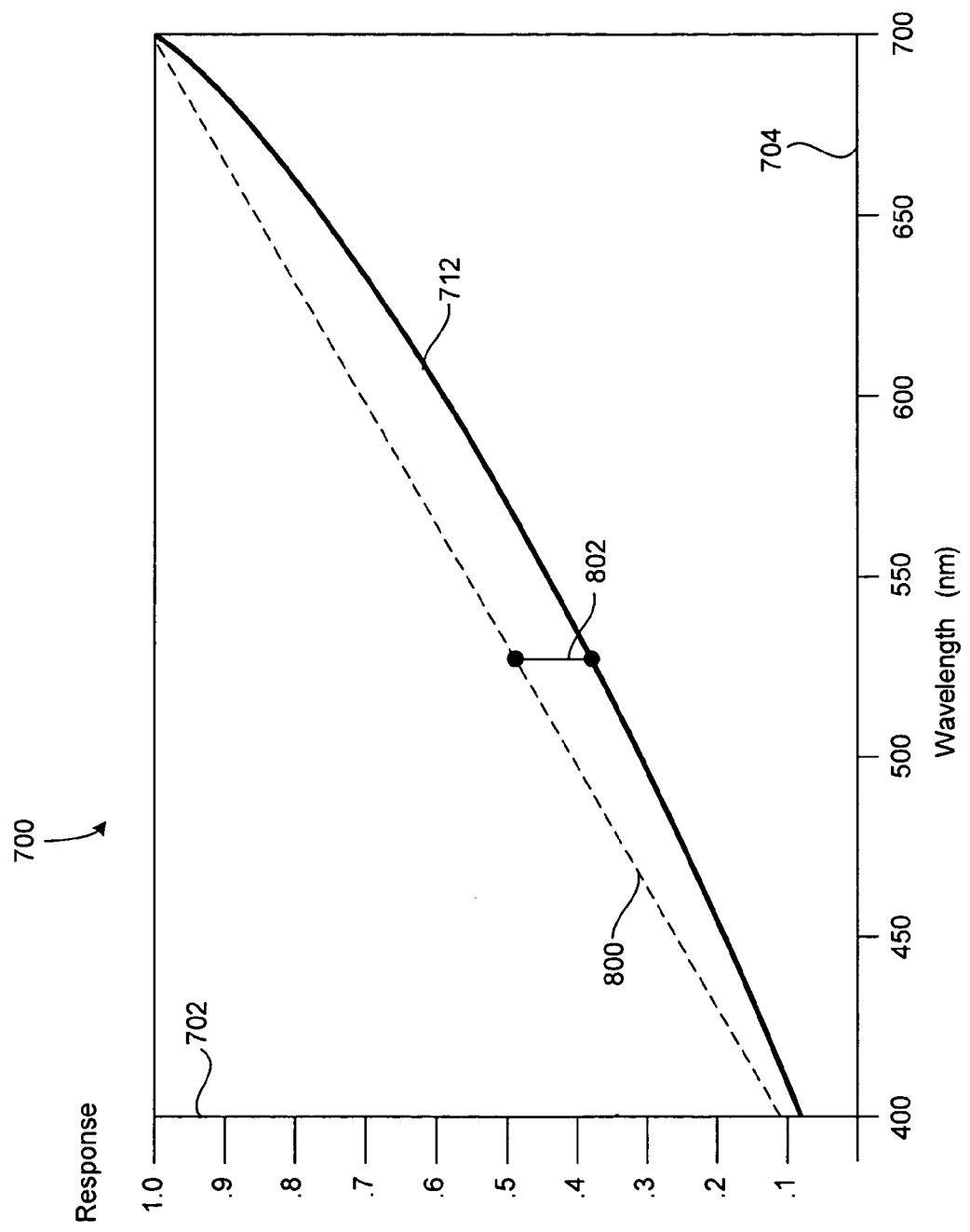
FIG. 8 is a graph illustrating intensity pattern values relative to ideal intensity pattern values, in accordance with an embodiment of the present invention.

FIG. 8 is a graph illustrating intensity curve 712 relative to an ideal intensity values 800. As noted above, response curve 712 represents data corresponding to intensity pattern image provided by light transmission medium 406 as captured by image capture device 108. When the data corresponding to the intensity pattern image is captured, the values are manipulated (e.g., via a lookup table or the like) relative to the ideal intensity values 800 as is known in the art.

Figure 9:
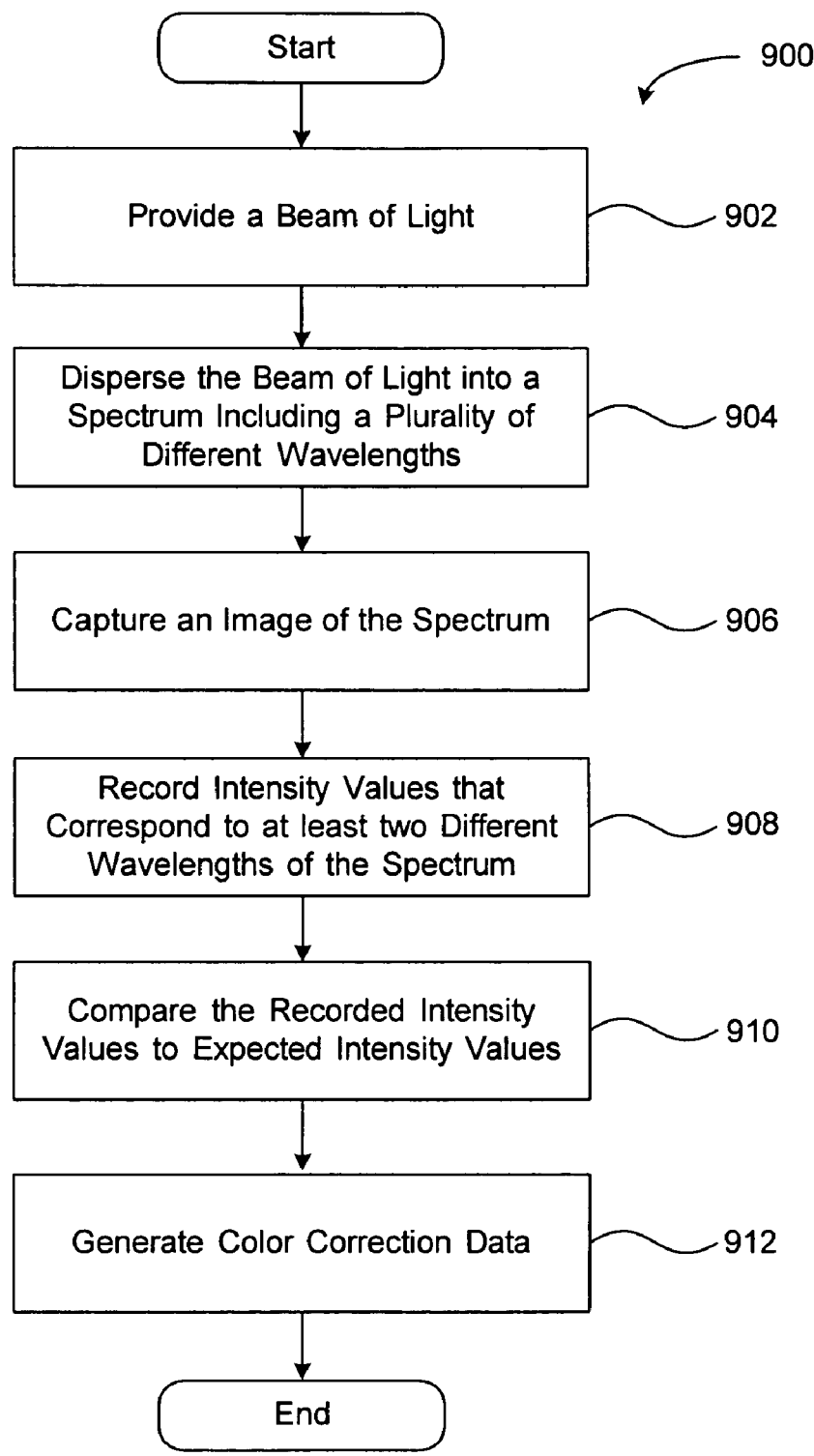
FIG. 9 is a flowchart illustrating a method for calibrating a digital camera, in accordance with an embodiment of the present invention.

FIG. 9 is a flow diagram 900 illustrating a method for calibrating a digital camera, in accordance with an embodiment of the present invention. In step 902, a beam of light is provided. In step 904, the beam of light is dispersed into a light dispersion image including a plurality of different wavelengths. In step 906, a test image of the light dispersion image is captured. Then, in step 908, intensity values corresponding to at least two different wavelengths of the test image are recorded. Next, in step 910, the recorded intensity values are compared to expected recorded intensity values. In step 912, color and/or intensity correction data is generated.

Figure 10:
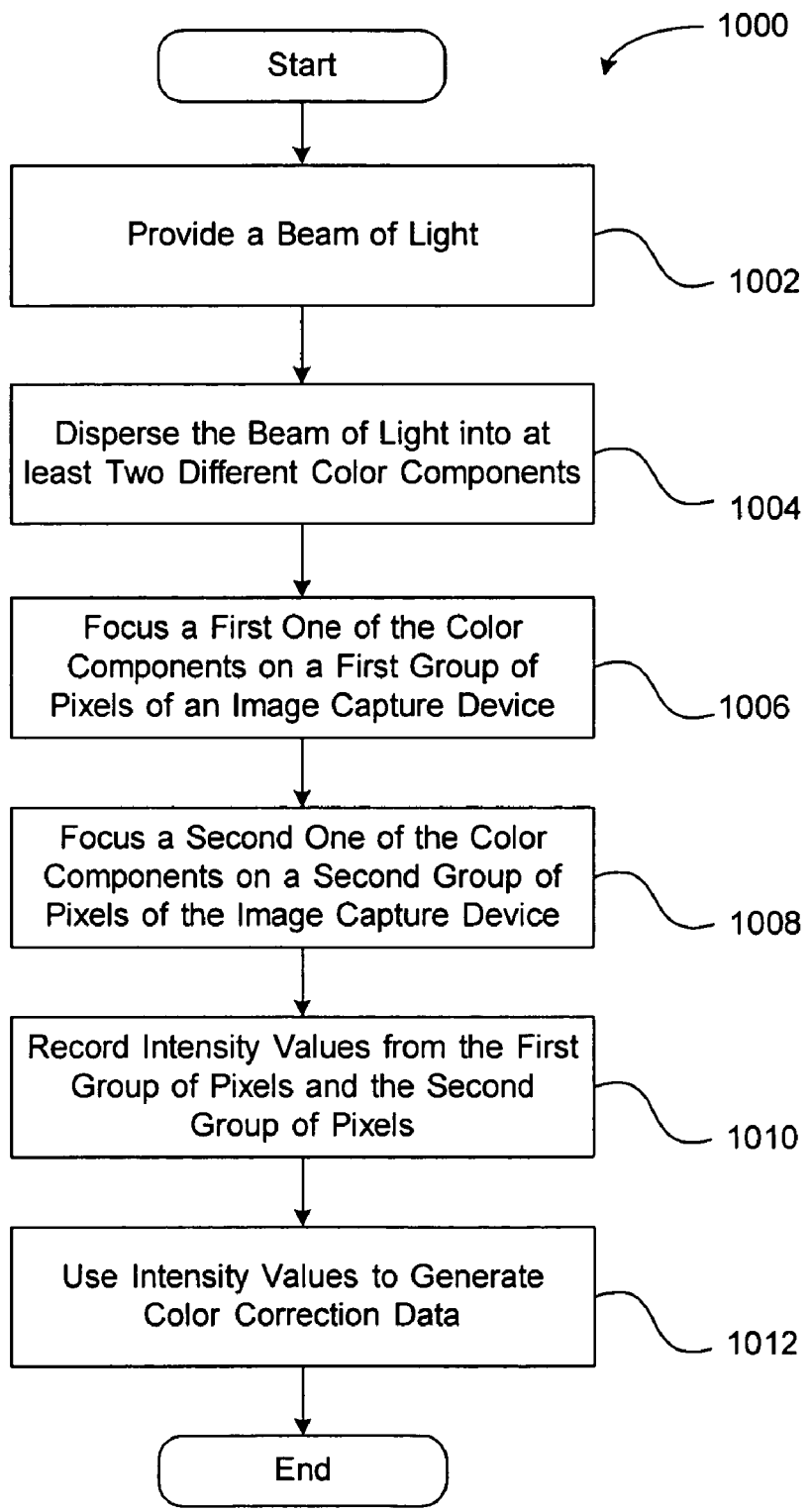
FIG. 10 is a flowchart illustrating another method for calibrating a digital camera, in accordance with an embodiment of the present invention.

FIG. 10 is a flow diagram 1000 illustrating another method for calibrating a digital camera, in accordance with an embodiment of the present invention. In step 1002, a beam of light is provided. In step 1004, the beam of light is dispersed into at least two different color components. In step 1006, a first one of the color components is focused on a first group of pixels of an image capture device. In step 1008, a second one of the color components is focused on a second group of pixels of the image capture device. In step 1010, intensity values from the first group of pixels and the second group of pixels are recorded. In step 1012, the intensity values are used to generate color and/or intensity correction data.

It will be appreciated that color and intensity calibration may be effected using just the color dispersion medium 404. For example, white light of a predetermined intensity pattern can be sent through the color dispersion medium 404. Alternatively or additionally, the white light may have a stable intensity values across its entire length. In another embodiment, light transmission medium 406 may be placed in series with color dispersion medium 404. In another embodiment, no light transmission medium 406 is included in test device 104.

Many of the described features may be substituted, altered or omitted without departing from the scope of the invention. These and other deviations from the particular embodiments shown will be apparent to those skilled in the art, particularly in view of the foregoing disclosure.

I claim:

1. A method of calibrating a digital camera, said method comprising:
   providing an image capture device adapted to be installed in said digital camera;
   providing light;
   dispersing said light into a color dispersion image including a plurality of different wavelengths of light;
   capturing a test image of said color dispersion image with said image capture device;
   obtaining intensity values corresponding to at least two of said different wavelengths of light from said test image;
   comparing said intensity values to expected intensity values; and
   generating color correction data based on said comparison.

2. A method of calibrating a digital camera according to claim 1, wherein said step of providing light includes providing a beam of tungsten light.

3. A method of calibrating a digital camera according to claim 1, wherein said step of dispersing said light includes dispersing said light via a test device.

4. A method of calibrating a digital camera according to claim 3, wherein said test device includes a light transmission medium.

5. A method of calibrating a digital camera according to claim 3, wherein said test device includes a color dispersion medium.

6. A method of calibrating a digital camera according to claim 5, wherein said color dispersion medium includes a variable band pass filter.

7. A method of calibrating a digital camera according to claim 5, wherein said color dispersion medium includes a translucent surface.

8. A method of calibrating a digital camera according to claim 3, wherein said test device includes an opaque plate with at least one window.

9. A method of calibrating a digital camera according to claim 8, wherein said opaque plate includes aluminum.

10. A method of calibrating a digital camera according to claim 8, wherein said opaque plate includes a non-reflective surface.

11. A method of calibrating a digital camera according to claim 1, further comprising using optics for focusing said color dispersion image on an image capture device.

12. A method of calibrating a digital camera according to claim 11, wherein said optics include an infrared filter.

13. A method of calibrating a digital camera according to claim 1, wherein said step of obtaining intensity values includes obtaining intensity values corresponding to more than two different wavelengths of light.

14. A method of calibrating a digital camera according to claim 13, wherein at least one of said intensity values corresponds to infrared wavelengths.

15. A method of calibrating a digital camera according to claim 13, further comprising obtaining at least two different values corresponding to an intensity pattern image containing a plurality of intensities of undispersed light transmitted through a light transmission medium.

16. A method of calibrating a digital camera according to claim 15, wherein said undispersed light includes light from a same light source used to provide said dispersed light.

17. A method of calibrating a digital camera according to claim 15, wherein said color dispersion image and said intensity pattern image are captured in the same test image.

18. A digital camera calibration device comprising:
   an opaque screen with a window;
   a color dispersion device disposed in said window; and
   a light source disposed to emit light through said color dispersion device and said window.

19. A digital camera calibration device according to claim 18, further comprising
   a second window; and
   a light transmission medium disposed in said second transparent window.

20. A digital camera calibration device according to claim 18, wherein said color dispersion device includes a variable band pass filter.

21. A digital camera calibration device according to claim 20, wherein said color dispersion device disperses white light into light at least of the visible spectrum.

22. A digital camera calibration device according to claim 18, wherein said opaque screen includes a substantially non-reflective surface.

23. A digital camera calibration device according to claim 22, wherein said non-reflective surface includes black paint.

24. A digital camera calibration device according to claim 18, wherein said opaque screen includes aluminum.

25. A method of calibrating an image capture device, said method comprising:
   providing said image capture device, said image capture device adapted to be installed in a digital camera;
   providing light;
   dispersing said light into at least two different color components;
   focusing a first one of said color components onto a first group of pixels of said image capture device;
   focusing a second one of said color components onto a second group of pixels of said image capture device;
   obtaining intensity values from said first group of pixels and said second group of pixels; and
   using said intensity values to generate color correction data.

26. A method according to claim 25, further comprising comparing said intensity values to expected intensity values.

27. A digital camera calibration device comprising:
   an opaque screen with a window;
   a light transmission medium disposed in said window, said light transmission medium operative to generate an intensity pattern image containing a plurality of intensities of undispersed light; and a light source disposed to emit light through said light transmission medium and said window.

28. A method of calibrating a digital camera, said method comprising:

providing light;

transmitting said light through a light transmission medium to generate an intensity pattern image containing a plurality of intensities of undispersed light;

capturing a test image of said intensity pattern image;

obtaining intensity values corresponding to said test image;

comparing said intensity values to expected intensity values; and generating intensity correction data based on said comparison.

* * * * *